(12) United States Patent
Suzuki et al.

(10) Patent No.: US 8,172,462 B2
(45) Date of Patent: May 8, 2012

(54) ROLLING BEARING AND ROLLING BEARING ASSEMBLY

(75) Inventors: Kazuya Suzuki, Kashiwara (JP); Naoki Tani, Kashiwara (JP); Junji Murata, Kashiba (JP); Kazuyoshi Yamakawa, Nishinomiya (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 466 days.

(21) Appl. No.: 12/314,365

(22) Filed: Dec. 9, 2008

(65) Prior Publication Data
US 2009/0148087 A1 Jun. 11, 2009

(30) Foreign Application Priority Data

Dec. 10, 2007 (JP) ................ P2007-317934
Dec. 12, 2007 (JP) ................ P2007-321158

(51) Int. Cl.
*F16C 33/38* (2006.01)
*F16C 33/66* (2006.01)
(52) U.S. Cl. .............. 384/470; 384/468; 384/523
(58) Field of Classification Search .............. 384/470, 384/523, 468
See application file for complete search history.

(56) References Cited

U.S. PATENT DOCUMENTS

| | | | | |
|---|---|---|---|---|
| 3,096,129 A | * | 7/1963 | Hay ................. | 384/470 |
| 4,932,500 A | * | 6/1990 | Smith et al. ................ | 384/470 |
| 2005/0063627 A1 | * | 3/2005 | Ueda et al. .................. | 384/523 |
| 2007/0071382 A1 | | 3/2007 | Suzuki | |

FOREIGN PATENT DOCUMENTS

| | | |
|---|---|---|
| JP | 49-36994(U) | 10/1974 |
| JP | 5-96548(U) | 12/1993 |
| JP | 7-12132 | 1/1995 |
| JP | 2003-042147(A) | 2/2003 |
| JP | 2004-108388 | 4/2004 |
| JP | 2004-108513 | 4/2004 |
| JP | 2004-347001 | 12/2004 |
| JP | 2007-92886 | 4/2007 |
| JP | 2007-303558 | 11/2007 |
| JP | 2007-315431 | 12/2007 |

\* cited by examiner

*Primary Examiner* — Thomas R Hannon
(74) *Attorney, Agent, or Firm* — McGinn IP Law Group, PLLC (57) ABSTRACT

There is provided a rolling bearing including an inner ring having an inner ring raceway surface, an outer ring having an outer ring raceway surface and a shoulder portion formed on one axial side of the outer ring raceway surface, a plurality of rolling elements which roll between the inner ring raceway surface and the outer ring raceway surface, and a cage adapted to hold the plurality of rolling elements at predetermined intervals in a circumferential direction and having a guided surface which confronts the shoulder portion of the outer ring in such a manner as to be brought into sliding contact therewith. The rotation of the cage is guided through sliding contact of the guided surface of the cage with a guiding surface of the shoulder portion of the outer ring. A guiding space which is a radial space between the guiding surface of the shoulder portion of the outer ring and the guided surface of the cage is made to increase as approaching the rolling elements.

5 Claims, 10 Drawing Sheets

ROLLING BEARING AND ROLLING BEARING ASSEMBLY

BACKGROUND OF THE INVENTION

1. Filed of the Invention

The present invention relates to a rolling bearing and a rolling bearing assembly which is lubricated by a lubricant supplied from an oil filling device.

2. Related Art

Conventionally, as angular contact ball bearings which have an inner ring, an outer ring, balls as rolling elements which are disposed between those rings, and a cage for retaining the balls, so-called outer ring guiding type rolling bearings have been proposed in which the rotation of the cage is guided through sliding contact of one shoulder portion of the outer ring and an outer circumference of the cage (refer to JP-A-2004-347001).

On the other hand, there have been proposed rolling bearing assemblies which include an oil filling unit having a pump for discharging a lubricant into an interior of a rolling bearing and a tank for containing the lubricant oil for filling a required amount of lubricant as required, whereby the lubricant oil is filled into the interior of the rolling bearing intermittently by a minute amount from the oil filling unit (refer to JP-A-2004-108388).

In an angular contact ball bearing described in JP-A-2004-347001, in the event that the amount of lubricant that is applied in advance is small, a lubrication failure is produced at a sliding contact portion between a shoulder portion of an outer ring and an outer circumferential surface of a cage to thereby cause a problem that seizure occurs in the cage, whereas in the event the amount of lubricant so applied is more than required, extra lubricant flows out of the rolling bearing to thereby cause a problem that the lubricant is used wastefully. In addition, in a rolling bearing assembly disclosed in JP-A-2004-108388, there has been a fear that the aforesaid problems would occur in the event that such an outer ring guiding type angular contact ball bearing is used as a rolling bearing that is used therein.

SUMMARY OF THE INVENTION

The invention has been made in view of these situations, and an object thereof is to provide a rolling bearing and a rolling bearing assembly which can prevent the occurrence of seizure in the cage even though only a small amount of lubricant is used and therefore can prevent the wasteful usage of lubricant.

According to an aspect of the invention, there is provided a rolling bearing including an inner ring having an inner ring raceway surface on an outer circumference, an outer ring having an outer ring raceway surface on an inner circumference and a shoulder portion formed on one axial side of the outer ring raceway surface in such a manner as to project radially inwards from the other axial side of the outer ring raceway surface, a plurality of rolling elements which roll between the inner ring raceway surface and the outer ring raceway surface, and a cage adapted to hold the plurality of rolling elements at predetermined intervals in a circumferential direction and having a guided surface which confronts the shoulder portion of the outer ring in such a manner as to be brought into sliding contact therewith, the rotation of the cage being guided through sliding contact of the guided surface of the cage with a guiding surface of the shoulder portion of the outer ring, wherein a guiding space which is a radial space between the guiding surface of the shoulder portion of the outer ring and the guided surface of the cage is made to increase as it approaches the rolling elements.

In this rolling bearing, since the guiding space which is the radial space between the shoulder portion of the outer ring and the guided surface of the cage is made to increase as it approaches the rolling elements, a larger amount of lubricant than on the conventional rolling bearing can be held within the guiding space. In this way, since the lubricant holding function of the guiding space is increased, the generation of seizure in the cage can be prevented even though the amount of lubricant is small.

In the rolling bearing, at least either of the guiding surface of the shoulder portion of the outer ring and the guided surface of the cage may be a tapered surface or a curved surface in which a section including its axis forms a curve which can be differentiated. In this case, too, since the lubricant holding capacity in the guiding space is increased, the generation of seizure in the cage can be prevented even though the amount of lubricant is small.

In the rolling bearing, it is preferable that the guided surface of the cage is made up of a cylindrical parallel surface and the guiding surface of the shoulder portion of the outer ring is made up of a tapered surface. When the guided surface of the cage is made up of a tapered surface, a tapered surface is formed on both outer circumferential surfaces of the cage in order to eliminate directionality, whereby an undercut is produced. When a molded cage is removed from a mold after molding, the removal of the molded cage is made difficult by the undercut so generated. However, when the guiding surface of the shoulder portion of the outer ring is made up of the tapered surface, by turning or grinding the shoulder portion of the outer ring, the tapered surface can easily be formed.

According to another aspect of the invention, there is provided a rolling bearing assembly including the rolling bearing described above and an oil filling unit for filling a minute amount of lubricant in the rolling bearing at predetermined intervals, wherein the oil filling unit includes a tank for storing a lubricant, a pump for sucking the lubricant in the tank for discharge, a lubricant discharging nozzle provided at a discharging opening of the pump for discharging the lubricant, and a driving part for driving the pump, wherein the lubricant discharging nozzle is disposed between an inner circumferential surface of the charge and the inner ring and is made to open in any position within a range where the cage and the inner ring confront each other.

According to the rolling bearing assembly, since the rolling bearing described above is used, the lubricant holding function by the guiding space is increased. By this, the generation of seizure in the cage can be prevented even though the amount of lubricant is small. In addition, since the lubricant discharging nozzle is made to open in any position within the axial range where the cage and the inner ring confront each other, a disruption to filling of lubricant can be prevented which would otherwise be caused by an air flow (an air curtain) that is produced by the rotation of the rolling bearing, thereby making it possible to make drops of lubricant adhere to any of the cage, the inner ring or the rolling elements in an ensured fashion.

According to the rolling bearing and the rolling bearing assembly of the invention, since the lubricant holding function by the guiding space is increased, the generation of seizure in the cage can be prevented even though the amount of lubricant is small. As a result, the wasteful usage of lubricant can be prevented.

According to an aspect of the invention, there is provided a rolling bearing including an inner ring having an inner ring raceway surface on an outer circumference, an outer ring having an outer ring raceway surface on an inner circumference and a shoulder portion formed on one axial side of the outer ring raceway surface in such a manner as to project radially inwards from the other axial side of the outer ring raceway surface, a plurality of rolling elements which roll between the inner ring raceway surface and the outer ring raceway surface, and a cage adapted to hold the plurality of rolling elements at predetermined intervals in a circumferential direction and whose rotation is guided through sliding contact of part of an outer circumference thereof with the shoulder portion of the outer ring, wherein the outer circumferential surface of the cage is a tapered surface in which the outer circumferential surface is formed in such a manner as to decrease in diameter as it extends from the one axial end portion to the other axial end portion or a curved surface in which a section including its axis forms a curve which can be differentiated.

In this rolling bearing, since the outer circumferential surface of the cage is formed in such a manner as to decrease in diameter as it extends from the one axial end portion to the other axial end portion, even in the event that lubricant flows to the other axial side of the outer circumferential surface of the cage, the lubricant so flowing can be led to the one axial side of the outer circumferential surface by being delivered thereover by virtue of centrifugal force. By this configuration, the occurrence of seizure in the cage can be prevented even though the amount of lubricant is small.

According to the rolling bearing of the invention, since the lubricant lying closer to the other axial side than the rolling elements on the outer circumferential surface of the cage can be lead to the one axial side of the outer circumferential surface by virtue of centrifugal force, the occurrence of seizure in the cage can be prevented even though the amount of lubricant is small. As a result, the wasteful usage of lubricant can be prevented.

DETAILED DESCRIPTION OF THE PREFERRED EMBODIMENTS

Hereinafter, embodiments of the invention will be described based on the accompanying drawings.

Figure 1:
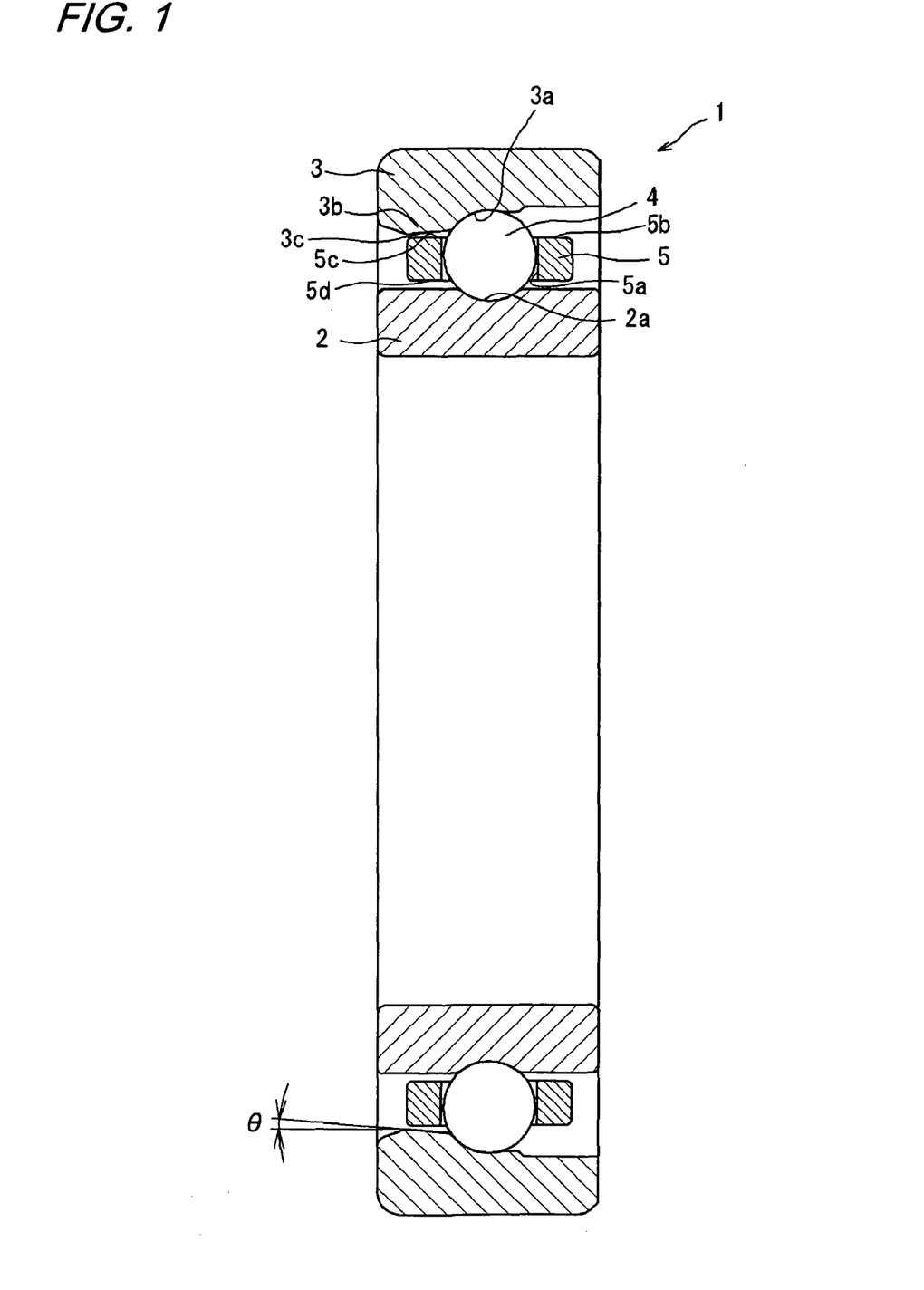
FIG. 1 is a schematic sectional view showing a rolling bearing according to a first embodiment of the invention.

FIG. 1 is a schematic sectional view of a rolling bearing according to a first embodiment of the invention. A rolling bearing 1 shown in FIG. 1 is an angular contact ball bearing which is made up of an inner ring 2, an outer ring 3, balls 4 functioning as rolling elements which are disposed between these rings, and a cage 5 for retaining the balls.

The inner ring 2 is formed into a ring shape and has a groove-like inner ring raceway surface 2a which is formed on an outer circumference along its full circumference in a circumferential direction.

The outer ring 3 is also formed into a ring shape and has a groove-like outer ring raceway surface 3a which is formed on an inner circumference along its full circumference in a circumferential direction. In addition, a shoulder portion 3b is formed on one axial side of the outer ring raceway surface 3a in such a manner as to project radially inwards from the other axial side of the outer ring raceway surface 3a for guiding the cage 5, which will be described later. The outer ring 3 is disposed concentrically with the inner ring 2.

The cage 5 is made of a synthetic resin such as phenol. A plurality of pockets 5a for accommodating the balls 4 individually are provided in the cage 5 at equal intervals in a circumferential direction, and a whole of outer circumferential surface 5b is made into a cylindrical parallel surface.

This cage 5 is disposed between an outer circumferential surface of the inner ring 2 and an inner circumferential surface of the outer ring 3 and concentrically with the inner ring 2 and the outer ring 3. The cage 5 has a guided surface 5c which confronts the shoulder portion 3b of the outer ring 3 in such a manner as to be brought into sliding contact with the shoulder portion 3b. In addition, the rotation of the cage 5 is guided by the guided surface 5c of the cage 5 being brought into sliding contact with the guiding surface 3c of the shoulder portion 3b of the outer ring 3.

The balls 4 are retained at equal intervals in the circumferential direction by being accommodated in the respective pockets 5a of the cage, so as to roll between the inner ring raceway surface 2a and the outer ring raceway surface 3a.

Figure 2:
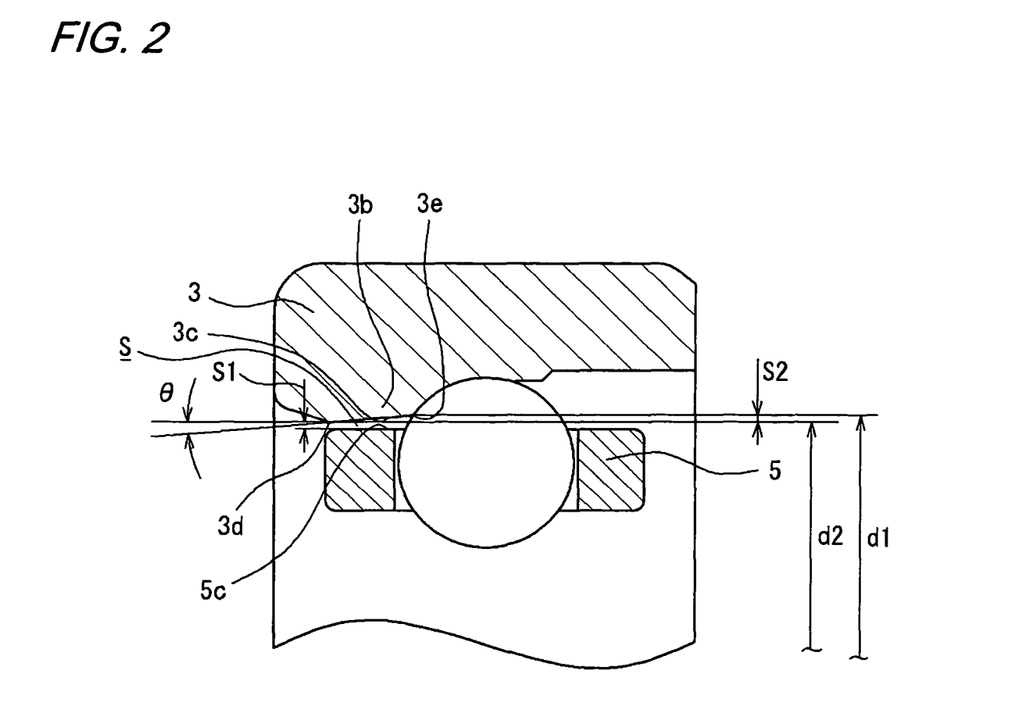
FIG. 2 is an enlarged sectional view illustrating an outer ring and a cage shown in FIG. 1.

FIG. 2 is an enlarged sectional view which illustrates the outer ring 3 and the cage 5. As is shown in FIG. 2, a radial space defined between the guiding surface 3c of the shoulder portion 3b of the outer ring 3 and the guided surface 5c of the cage 5 constitutes a guiding space S. Here, the guided surface 5c of the cage 5 is made into a cylindrical parallel surface, and a radial space S1 defined between the guided surface 5c of the cage 5 and an external end portion 3d of the guiding surface 3c of the outer ring 3 is, for example, in the range of 0.2 to 0.4 mm. The guiding surface 3c of the shoulder portion 3b of the outer ring is made into a tapered surface which is formed into a taper shape in which its diameter gradually increases from the external end portion 3d of the guiding surface 3c to a rolling element side end portion 3e. An angle θ of the tapered surface is, for example, in the range of 0.1 to 1°, and a difference between an inside diameter d1 of the rolling element side end portion 3e and an inside diameter d2 of the external side end portion 3d of the guiding surface 3c is made to be, for example, in the range of 0.01 to 0.14 mm. In addition, the angle θ can be set as required depending upon the size of the rolling bearing.

In this way, the guiding space S is made to increase as it approaches the balls 4 which are rolling elements.

In the rolling bearing 1, the rotation of the cage 5 is guided by the guided surface 5c of the cage 5 being brought into sliding contact with the guiding surface 3c of the shoulder portion 3b of the outer ring 3. Here, since the guiding space S defined between the guiding surface 3c of the shoulder portion 3b of the outer ring 3 and the guided surface 5c of the cage 5 is made to increase as it approaches the balls 4, a larger amount of lubricant than on the conventional rolling bearing can be held within the guiding space S. In this way, since the lubricant holding function of the guiding space S is increased, the generation of seizure in the cage 5 can be prevented even though the amount of lubricant is small. In addition, in the conventional rolling bearing, since a cage 5 vibrates as the cage 5 rotates and hence, an outer circumferential surface 5b of the cage 5 is inclined relative to an axis of an outer ring 3, the outer circumferential surface of the cage 5 abuts obliquely against a cylindrical parallel surface of a shoulder portion 3b formed on one side of the outer ring 3, whereby the contact surface pressure is increased locally on the ball 4 side. However, by setting the guiding space S as described above, the cage 5 is made easy to be brought into surface contact with the shoulder portion 3b of the outer ring 3, and a local application of high surface pressure to the cage 5 is mitigated, whereby the occurrence of seizure in the cage 5 can be prevented more effectively. In addition, since the amount of lubricant to be filled is small, a change in torque of the rolling bearing 1 is reduced, whereby a leakage of lubricant to the outside of the bearing can be prevented. As a result of these advantages, the wasteful usage of lubricant can be prevented.

From these facts, when the rolling bearing 1 is lubricated by oil lubricate or oil and air, the rolling bearing 1 can be lubricated with a small amount of lubricant.

Figure 3:
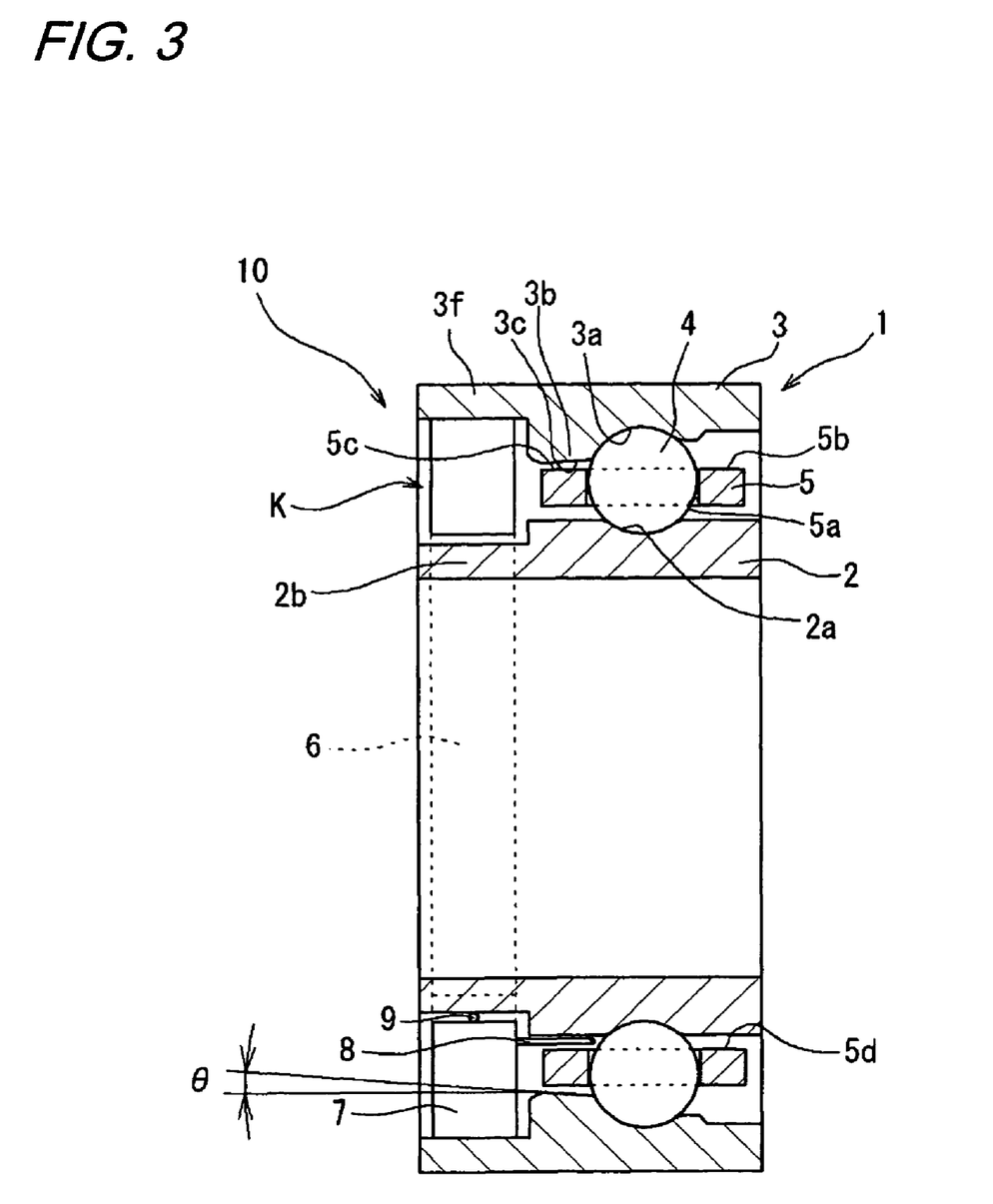
FIG. 3 is a schematic sectional view showing a rolling bearing assembly according to the invention.

FIG. 3 is a schematic sectional view of a rolling bearing assembly according to the invention.

A rolling bearing assembly 10 shown in FIG. 3 includes the rolling bearing 1 that has been described heretofore and an oiling or oil filling unit K. The rolling bearing 1 is lubricated by a minute amount of lubricant being filled in an interior of the rolling bearing at predetermined intervals. Here, the "minute amount" of lubricant means that an amount of lubricant that is filled at one time is in the order of nanoliter (nL).

Figure 4:
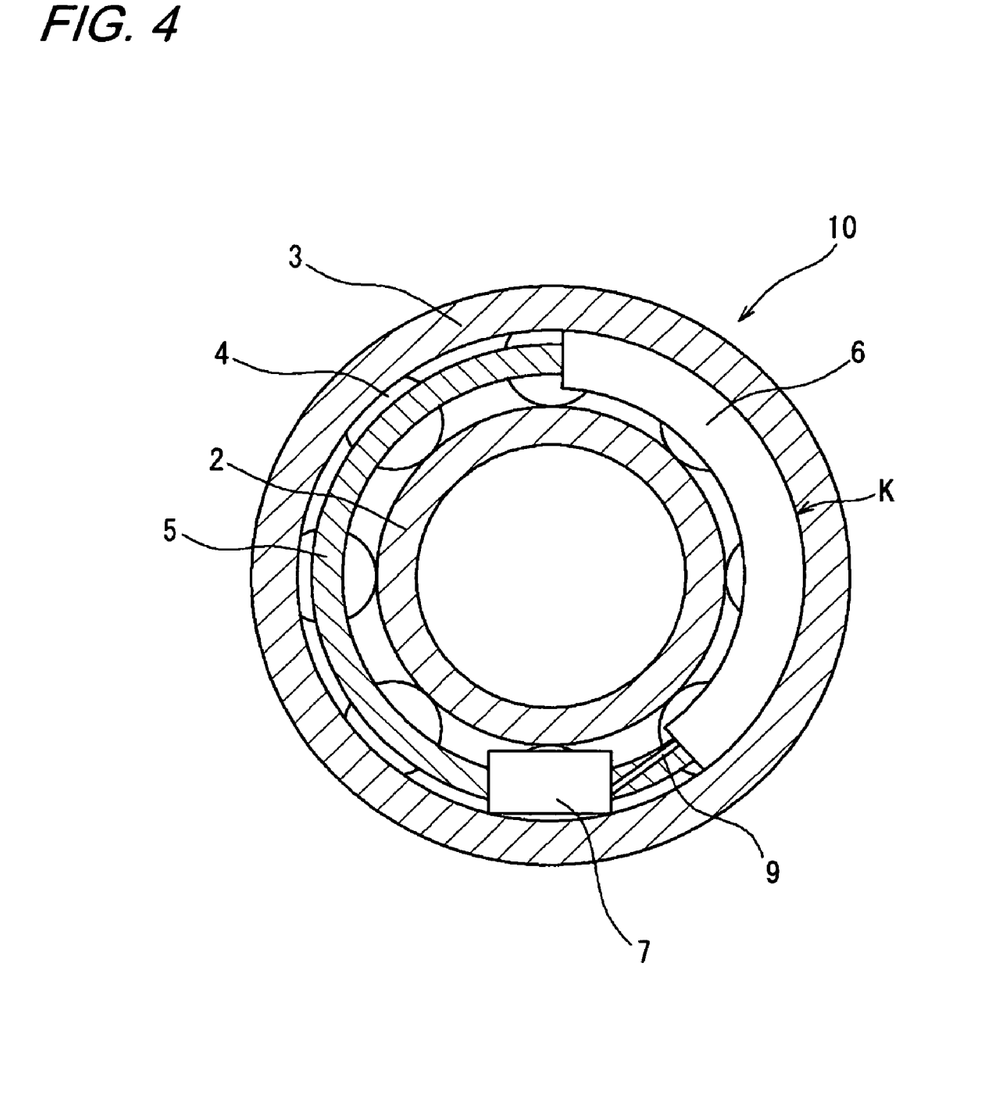
FIG. 4 is a side view of the rolling bearing assembly shown in FIG. 3.

FIG. 4 is a side view of the rolling bearing assembly 10 shown in FIG. 3, which illustrates the oil filling unit K.

The oil filling unit K includes, for example, a tank 6 for storing lubricant, a pump 7 for sucking the lubricant in the tank 6 for discharge, a lubricant discharging nozzle 8 which is provided at a discharging opening of the pump 7 for discharging the lubricant and a driving part (not shown) for driving the pump 7.

In this embodiment, as is shown in FIGS. 3 and 4, the tank 6 and the pump 7 are incorporated in the rolling bearing 1.

Namely, in addition to the portion where the balls 4 are retained, extended portions 2b, 3f are formed respectively on the inner ring 2 and the outer ring 3 for installing the oil filling unit, and the pump 7 is detachably attached to an inner circumferential surface of the oil filling unit installation extended portion 3f of the outer ring 3. In addition, the tank 6 is formed into an arc-like shape as viewed from the axial direction of the rolling bearing assembly 10 and is detachably attached to the inner circumferential surface of the oil filling unit installation extended portion 3f of the outer ring 3 in such a manner as to lie adjacent to the pump 7 in the circumferential direction. The tank 6 and the pump 7 are connected to each other by a conduit 9.

The pump 7 is a diaphragm pump in which by reciprocating a diaphragm which is a driven portion by a piezoelectric device, the lubricant within the tank 6 is sucked into a chamber of the pump 7 and the lubricant so sucked is then discharged from the lubricant discharging nozzle 8.

The lubricant discharging nozzle 8 is disposed between the inner circumferential surface 5d of the cage 5 and the inner ring 2 and is made to open in any position which lies within an axial range where the cage 5 and the inner ring 2 confront each other, whereby the lubricant in the tank 6 is filled to the vicinity of the inner ring raceway surface 2a of the inner ring 2 and the balls 4 by a minute amount. Since the lubricant discharging nozzle 8 opens in the position described above, a disruption to filling of lubricant can be prevented which would otherwise be caused by an air flow (an air curtain) that is caused by the rotation of the rolling bearing 1, whereby drops of lubricant can be made to adhere to any of the cage 5, the inner ring 2 or the balls 4 in an ensured fashion.

A power supply battery (or a generator) or a transformer circuit of an external power supply, a pump control circuit and the like are provided in the driving part, and the pump 7 is driven by a voltage signal from the driving part, whereby by the pump 7 sucking the lubricant from the tank 6, the lubricant is discharged from the lubricant discharging nozzle 8 towards the balls 4 and the inner ring raceway surface 2a.

By this action, the contact areas between the balls 4 and the inner and outer ring raceway surfaces 2a, 3a, the guiding space S between the guided surface 5c of the cage 5 and the guiding surface 3c of the outer ring 3 and the contact areas between the balls 4 and the pockets 5a are lubricated.

As types of base oil of the lubricant, any of ester-based, ether-based, fluorine-based, silicone-based and synthetic hydrocarbon-based oil may be used. As lubricant, there can be raised, for example, fluorinated polymer oil, fluorinated polyether oil, alkyl diphenyl ether oil, polyphenyl ether oil, polyol ester oil, and poly alpha olefin oil, and these oils can be used solely or two or more of those oils can be combined for use. [0024]-(1)

According to the rolling bearing assembly 10, by the use of the rolling bearing 1 described above, a larger amount of lubricant discharged from the discharging nozzle 8 can be held in the guiding space S defined between the outer ring 3 and the cage 5, and therefore, the lubricant holding function is enhanced. By this, the occurrence of seizure in the cage 5 can be prevented even though the amount of lubricant is small, thereby making it possible to prevent the wasteful usage of lubricant.

In this way, since the interior of the bearing can be lubricated even though the amount of lubricant is small, an interval at which lubricant is supplied to the tank 6 of the rolling bearing assembly 10 can be lengthened, whereby the number of times of servicing of the rolling bearing assembly 10 can be reduced.

In addition, the invention is not limited to the embodiments, and hence the invention can be modified as required without departing from the spirit and scope thereof.

In the rolling bearing 1 according to the first embodiment, while the guiding surface 3c of the outer ring 3 is made into the tapered surface and the guided surface 5c of the cage 5 is made into the cylindrical parallel surface, the invention is not limited thereto. As long as the guiding space S can be made such that the guide space S increases as it approaches the balls 4 which are rolling elements, any other configurations may be adopted. For example, the guiding surface 3c of the outer ring 3 may be made into a cylindrical parallel surface, while the guided surface 5c of the cage 5 may be made into a tapered surface. In addition, both the guiding surface 3c and the guided surface 5c can be made into a tapered surface. In addition, instead of those surfaces being made into the tapered surface, they may be made into a curved surface in which a curve is formed which can be differentiated on a cross section containing the axis.

Figure 5:
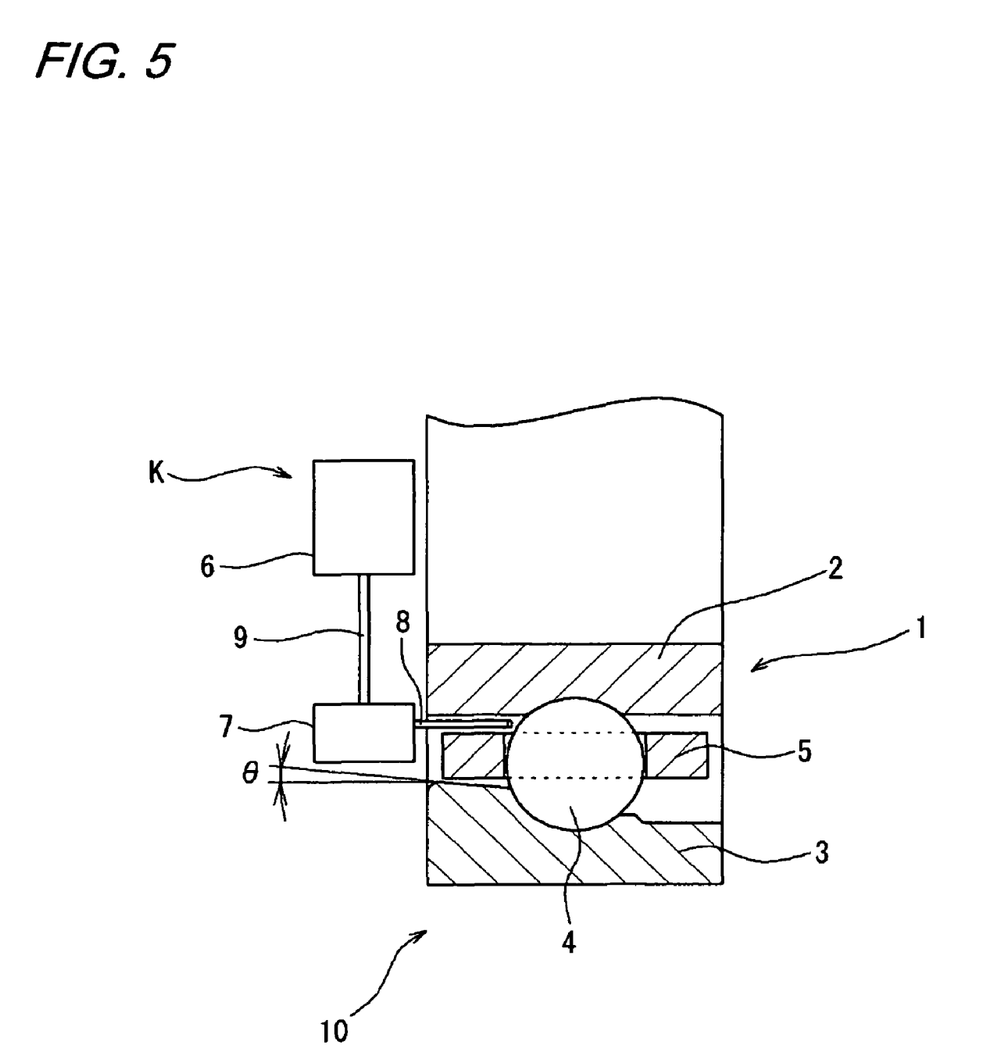
FIG. 5 is a schematic sectional view illustrating another attaching position of an oil filling unit.

In addition, in the rolling bearing assembly 10, while the tank 6 and the pump 7 of the oil filling unit K are incorporated in the rolling bearing 1, the tank 6 and the pump 7 may be attached to a position outside the rolling bearing 1, for example, an appropriate position such as a housing to which the rolling bearing 1 is attached. In addition, as is shown in FIG. 5, all the configurations of the oil filling unit K may be provided outside the rolling bearing 1 or on the contrary, all the configurations of the oil filling unit K can be incorporated in the rolling bearing 1.

As long as the oil filling unit K of the rolling bearing assembly 10 can fill lubricant in the interior of the rolling bearing bit by bit, the invention is not limited to the configuration according to the second embodiment described above. For example, an oil mist lubricating unit, an oil and air lubricating unit or an oil jet lubricating unit may be adopted, provided that those unit can fill a minute amount of lubricant in the rolling bearing.

EXAMPLES

Next, the invention will be described in greater detail based on examples thereof. However, it should be understood that the invention is not limited to those examples.

Example 1

Figure 6:
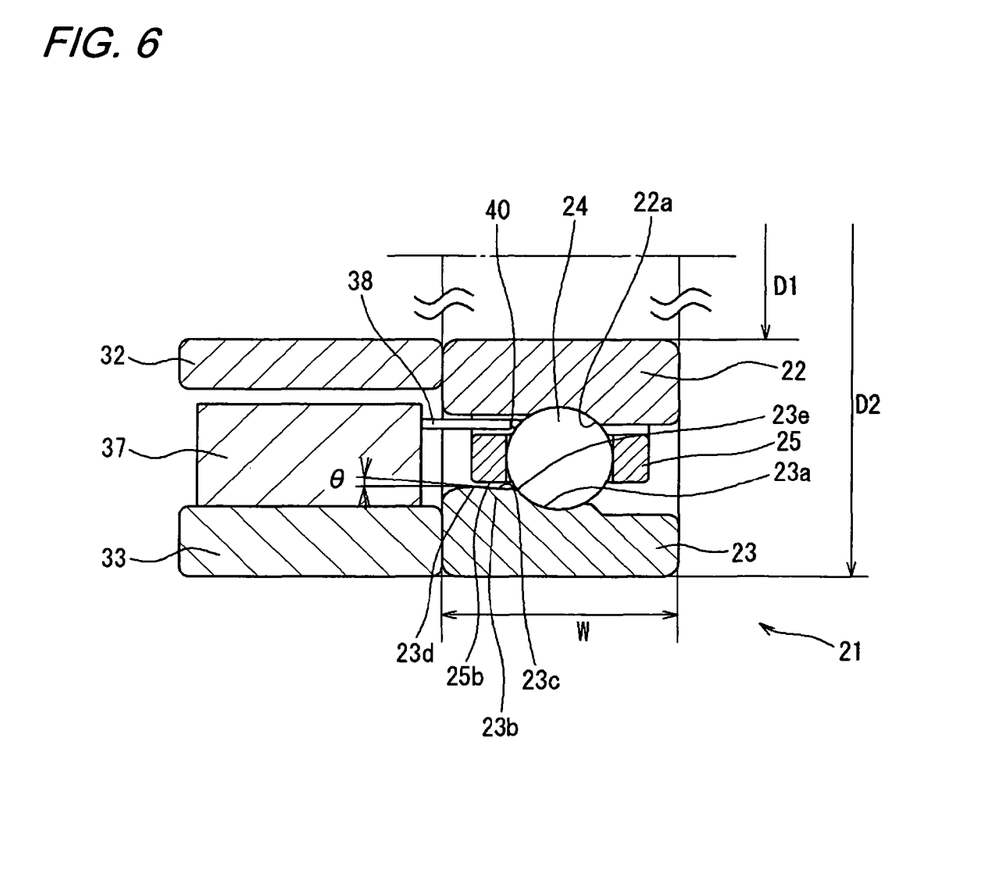
FIG. 6 is a schematic sectional view of a sample bearing for use in examples.

An angular contact ball bearing shown in FIG. 6 was prepared as a sample bearing 21 having an inside diameter (D1) of 70 mm, an outside diameter (D2) of 110 mm, and an assembled width (W) of 20 mm. This sample bearing 21 is such that a cage 25 is guided by a shoulder portion 23b on one side of an outer ring 23. A guiding surface 23c of the shoulder portion 23b is made into a tapered surface, and a difference S2 between an inside diameter (95.212 mm) of a rolling element side end portion 23e and an inside diameter (95.2 mm) of an external end portion 23d of the guiding surface 23c is 0.012 mm. In addition, an angle θ of the guiding surface 23c of the outer ring 23 is 0.17°.

The sample bearing 21 was washed and degreased, and a total of 20 μL of spindle oil (VG 22), 10 μL to balls 24 and 10 μL to a guided surface 25b of the cage 25 and the guiding surface 23c of the outer ring 23, was applied to those constituent parts using a micro syringe from the outside as initial lubricant.

An inner ring spacer 32 and an inner ring 22 to which the balls 24 and the cage 25 were assembled were fitted on an outer circumferential surface of a shaft, not shown, and an outer ring spacer 33 and the outer ring 23 were fitted in an inner circumferential surface of a housing, whereby the sample bearing 21 was assembled on the shaft and in the housing. A preload of 1300 N was preloaded on the sample bearing 21.

A pump 37 connecting to a lubricant discharging nozzle 38, a conduit, not shown, communicating with the pump 37 and a tank, not shown, communicating with the conduit were provided in an inner circumference of the outer ring spacer 33. The lubricant discharging nozzle 38 was made to open to a space defined between an inner circumferential surface of the cage 25 and an outer circumferential surface of the inner ring 22 and within in a range where the inner circumferential surface of the cage 25 and the outer circumferential surface of the inner ring overlapped in a radial direction. The lubricant discharging nozzle 38 was disposed in such a manner as to contact neither the cage 25 nor the inner ring 22. The lubricant nozzle 38 was formed into a circular cylindrical shape and extended in an axial direction from the pump 37. One ends of threads 40 were fixed to a distal end of the lubricant discharging nozzle 38, and the threads 40 had at the other ends a length which allows the threads 40 to be brought into contact with the ball 24.

Figure 7:
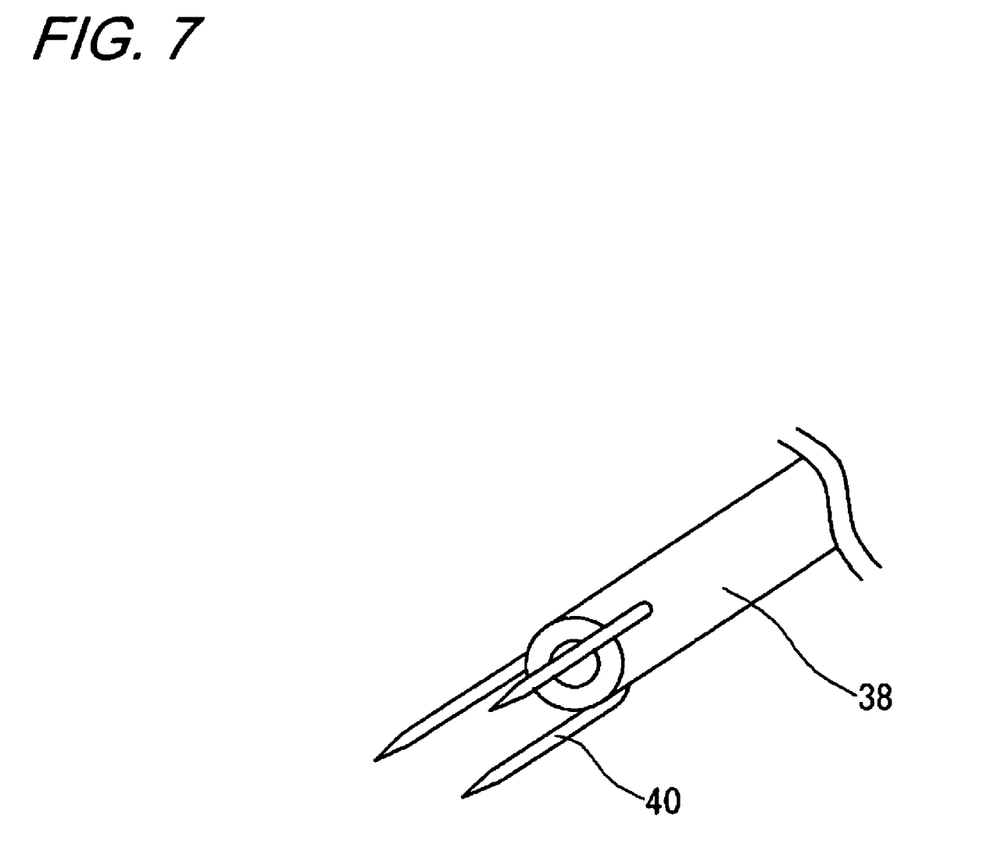
FIG. 7 is an enlarged perspective view illustrating a lubricant discharging nozzle and threads shown in FIG. 6.

The other ends of the threads 40 contacted the ball 24 directly or via lubricant filled. As is shown in FIG. 7, the threads 40 were bonded and fixed to an open end of the lubricant discharging nozzle 38 in three equally spaced apart locations (spaced apart at intervals of 120°). When the pump 37 was driven by a driving part, not shown, lubricant in the tank was sucked, and the lubricant supplied from the pump 37 was filled to the ball 24, the inner ring 22 and the cage 25 directly from the opening of the lubricant discharging nozzle 38 or through the threads 40. Compared with a case where no thread 40 is provided, lubricant could be filled to the balls 24 in a better fashion by the provision of the threads 40.

Thereafter, spindle oil (VG22) was discharged 20 nL/min from the opening of the lubricant discharging nozzle 38 to the balls 24 directly or via the threads 40, and the sample bearing 21 was rotated at a rotational speed of 20000 r/min for eight hours while cooling the jacket, and whether the sample bearing 21 passed or failed was determined. The determination of passing or failure was based on a standard in which the sample bearing 21 was determined as having passed the test in the event that the resulting vibration value was less than three times of the initial vibration value, in which case passing was denoted by ◯, whereas the sample bearing 21 was determined as having failed in the event that the resulting vibration value was equal to or more than three times of the initial vibration value, in which case failure was denoted by x. In addition, in the event that the vibration value became equal to or more than three times of the initial vibration value before eight hours had elapsed, the test was stopped at the point in time. The results of the tests carried out are shown in Table 1.

Example 2

The sample bearing 21 was tested in the similar way in which the sample bearing 21 of Example 1 was tested. However, in Example 2, the sample bearing 21 was rotated without cooling the jacket. The results of the tests carried out are shown in Table 1.

Comparison Example 1

A sample bearing 21 was used in which a guiding surface 23c of an outer ring 23 was made into a cylindrical parallel surface and an inside diameter of the guiding surface 23c was 95.2 mm. The sample bearing 21 was tested in the similar way in which the sample bearing 21 of Example 1 was tested. The results of the tests carried out are shown in Table 1.

Comparison Example 2

A sample bearing 21 was used in which a guiding surface 23c of an outer ring 23 was made into a cylindrical parallel surface and an inside diameter of the guiding surface 23c was 95.2 mm. The sample bearing 21 was tested in the similar way in which the sample bearing 21 of Example 1 was tested. However, the sample bearing 21 was rotated without cooling the jacket. The results of the tests carried out are shown in Table 1.

TABLE 1

|  | Example 1 | Example 2 | Comp. Example 1 | Comp. Example 2 |
| --- | --- | --- | --- | --- |
| Rotating Hours | 8 | 8 | 2 | 3.25 |
| Pass or Failure | ◯ | ◯ | X | X |

It is found from the results of the tests shown in Table 1 that compared with the comparison examples in which the guiding surfaces of the outer rings were made into the cylindrical parallel surfaces as in the case with the conventional rolling bearings, with the examples in which the guiding surfaces of the outer rings were made into the tapered surfaces, the bearings could rotate very longer hours with the same amount of lubricant filled.

Figure 8:
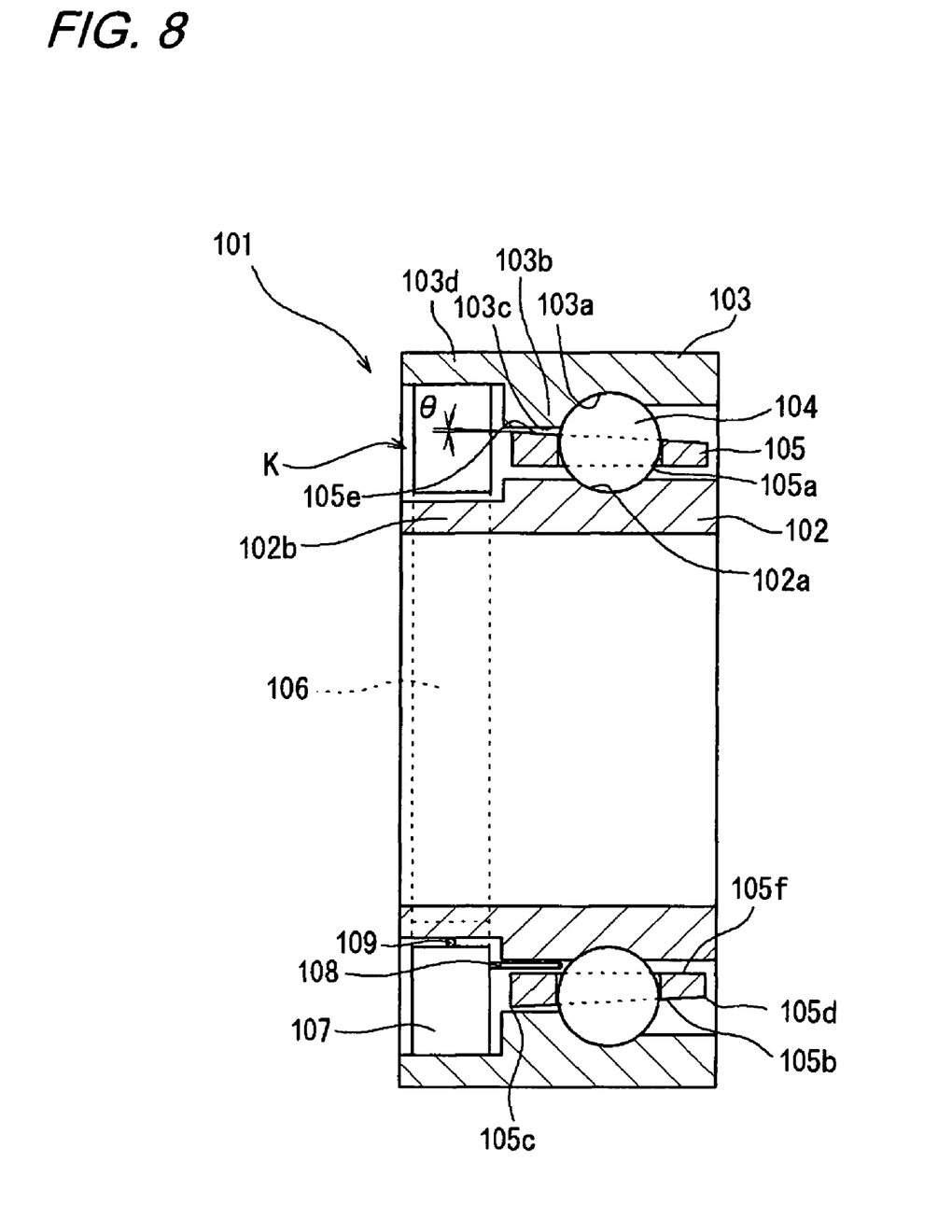
FIG. 8 is a schematic sectional view showing a rolling bearing according to a second embodiment of the invention.

FIG. 8 is a schematic sectional view of a rolling bearing according to a second embodiment of the invention. A rolling bearing 101 shown in FIG. 8 is an angular contact ball bearing which is made up of an inner ring 102, an outer ring 103, balls 104 functioning as rolling elements which are disposed between these rings, and a cage 105 for retaining the balls.

The inner ring 102 is formed into a ring shape and has a groove-like inner ring raceway surface 102a which is formed on an outer circumference along its full circumference in a circumferential direction.

The outer ring 103 is also formed into a ring shape and has a groove-like outer ring raceway surface 103a which is formed on an inner circumference along its full circumference in a circumferential direction. In addition, a shoulder portion 103b is formed on one axial side of the outer ring raceway surface 103a in such a manner as to project radially inwards from the other axial side of the outer ring raceway surface 103a for guiding the cage 105, which will be described later. The outer ring 103 is disposed concentrically with the inner ring 102.

The cage 105 is made of a synthetic resin such as phenol. A plurality of pockets 105a for accommodating the balls 104 individually are provided in the cage 105 at equal intervals in a circumferential direction.

An outer circumferential surface 105b of the cage 105 is a tapered surface in which the outer circumferential surface is formed in such a manner as to decrease in diameter as it extends from a one axial end portion 105c to the other axial end portion 105d. An angle θ of the tapered surface can be set as required depending upon the size of the rolling bearing 101, however, it is, for example, in the range of 0.1 to 1°.

This cage 105 is disposed between the outer circumferential surface of the inner ring 102 and the inner circumferential surface of the outer ring 103 and substantially concentrically with the inner ring 102 and the outer ring 103. In addition, the rotation of the cage 105 is guided by a surface (a guided surface) 105e of the outer circumferential surface 105b of the cage 105 which confronts the shoulder portion 103b of the outer ring 103 being brought into partial sliding contact with an inner circumferential surface (a guiding surface) 103c of the shoulder portion 103b of the outer ring 103 in a circumferential direction.

In addition, the balls 104 are retained at predetermined intervals in the circumferential direction by being accommodated in the respective pockets 105a of the cage 105 individually and roll between the inner ring raceway surface 102a and the outer ring raceway surface 103a.

The rolling bearing 101 is lubricated by a minute amount of lubricant being filled in an interior of the rolling bearing by an oil filling unit K. Here, the "minute amount" of lubricant means that an amount of lubricant that is filled at one time is in the order of nanoliter (nL).

Figure 9:
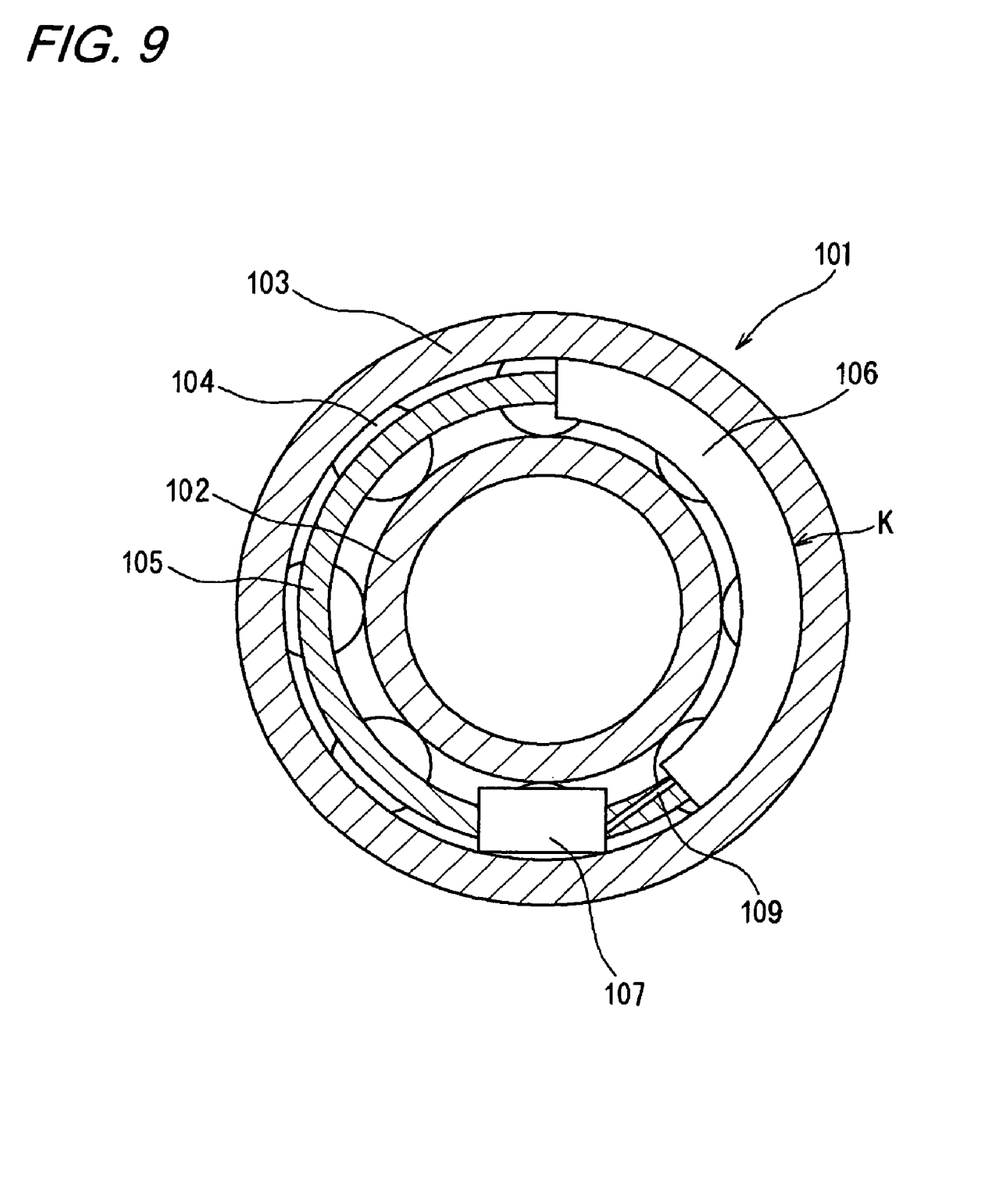
FIG. 9 is a side view of the rolling bearing shown in FIG. 8.

FIG. 9 is a side view of the rolling bearing 101 shown in FIG. 8, which illustrates the oil filling unit K.

The oil filling unit K includes, for example, a tank 106 for storing lubricant, a pump 107 for sucking the lubricant in the tank 106 for discharge, a lubricant discharging nozzle 108 which is provided at a discharging opening of the pump 107 for discharging the lubricant and a driving part (not shown) for driving the pump 107.

In this embodiment, as is shown in FIGS. 8 and 9, the tank 106 and the pump 107 are incorporated in the rolling bearing 101.

Namely, in addition to the portion where the balls 104 are retained, extended portions 102b, 103d are formed respectively on the inner ring 102 and the outer ring 103 for installing the oil filling unit, and the pump 107 is detachably attached to an inner circumferential surface of the oil filling unit installation extended portion 103d of the outer ring 103. In addition, the tank 106 is formed into an arc-like shape as viewed from the axial direction of the rolling bearing 101 and is detachably attached to the inner circumferential surface of the oil filling unit installation extended portion 103d of the outer ring 103 in such a manner as to lie adjacent to the pump 107 in the circumferential direction. The tank 106 and the pump 107 are connected to each other by a conduit 109.

The pump 107 is a diaphragm pump in which by reciprocating a diaphragm which is a driven portion by a piezoelectric device, the lubricant within the tank 106 is sucked into a chamber of the pump 107 and the lubricant so sucked is then discharged from the lubricant discharging nozzle 108.

The lubricant discharging nozzle 108 is disposed between the inner circumferential surface 105f of the cage 105 and the inner ring 102 and is made to open in any position which lies within an axial range where the cage 105 and the inner ring 102 confront each other, whereby the lubricant in the tank 106 is filled to the vicinity of the inner ring raceway surface 102a of the inner ring 102 and the balls 104 by a minute amount. Since the lubricant discharging nozzle 108 opens in the position described above, a disruption to filling of lubricant can be prevented which would otherwise be caused by an air flow (an air curtain) that is caused by the rotation of the rolling bearing 101, whereby drops of lubricant can be made to adhere to any of the cage 105, the inner ring 102 or the balls 104 in an ensured fashion.

A power supply battery (or a generator) or a transformer circuit of an external power supply, a pump control circuit and the like are provided in the driving part, and the pump 107 is driven by a voltage signal from the driving part, whereby by the pump 107 sucking the lubricant from the tank 106, the lubricant is discharged from the lubricant discharging nozzle 108 towards the balls 104 and the inner ring raceway surface 102a.

By this action, the rolling portion where the balls 104 and the inner and outer ring raceway surfaces 102a, 103a are brought into contact with each other, the guiding portion where the guided surface 105e of the cage 105 and the guiding surface 103c of the outer ring 103 are brought into contact with each other, and the contact areas between the balls 104 and the pockets 105a are lubricated.

As types of base oil of the lubricant, any of ester-based, ether-based, fluorine-based, silicone-based and synthetic hydrocarbon-based oil may be used. As lubricant, there can be raised, for example, fluorinated polymer oil, fluorinated polyether oil, alkyl diphenyl ether oil, polyphenyl ether oil, polyol ester oil, and poly alpha olefin oil, and these oils can be used solely or two or more of those oils can be combined for use.

According to the rolling bearing 101, in the event that lubricant discharged from the lubricant discharging nozzle 108 flows to the other axial side of the outer circumferential surface 105b of the cage 105, the lubricant oil having so flowed can be lead to the one axial side of the outer circumferential surface by virtue of centrifugal force by being delivered thereover, the occurrence of seizure in the cage can be prevented even though the amount of lubricant is small. In addition, in the conventional rolling bearing, since a cage 105 vibrates as the cage 105 rotates and hence, an outer circumferential surface 105b of the cage 105 is inclined relative to an axis of an outer ring 103, the outer circumferential surface of the cage 105 abuts obliquely against a cylindrical parallel surface of a shoulder portion 103b formed on one side of the outer ring 103, whereby the contact surface pressure is increased locally on the ball 104 side. However, by forming the outer circumferential surface 105b of the cage 105 in the way described above, the cage 105 is made easy to be brought into surface contact with the shoulder portion 103b of the outer ring 103, and a local application of high surface pressure to the cage 105 is mitigated, whereby the occurrence of seizure in the cage 105 can be prevented more effectively. In addition, since the amount of lubricant to be filled is small, a change in torque of the rolling bearing 101 is reduced, whereby a leakage of lubricant to the outside of the bearing can be prevented. As a result of these advantages, the occurrence of seizure in the cage can be prevented even though the amount of lubricant is small, and therefore, the wasteful usage of lubricant can be prevented.

In this way, in the rolling bearing 101, since the interior of the bearing can be lubricated even though the amount of lubricant is small, an interval at which lubricant is supplied to the tank 106 of the oil filling unit K can be lengthened, whereby the number of times of servicing of the rolling bearing 101 can be reduced.

In addition, the invention is not limited to the embodiments, and hence the invention can be modified as required without departing from the spirit and scope thereof.

In the embodiment, while the outer circumferential surface 105b of the cage 105 is made into the tapered surface in which the outer circumferential surface is formed in such a manner as to decrease in diameter as it extends from the one axial end portion 105c to the other axial end portion 105d, in place of the tapered surface, the outer circumferential surface 105b may be made into a curved surface in which a curve is formed which can be differentiated on a cross section containing the axis.

In addition, while the guiding surface 103c of the outer ring 103 is made into the cylindrical parallel surface, the invention is not limited to the cylindrical parallel surface. The guiding surface 103c of the outer ring 103 may be made into a tapered surface in which the guiding surface 103c is formed in such a manner as to increase in diameter as it approaches the rolling elements (balls) 104 or a curved surface in which a curve is formed which can be differentiated on a cross section containing the axis.

Figure 10:
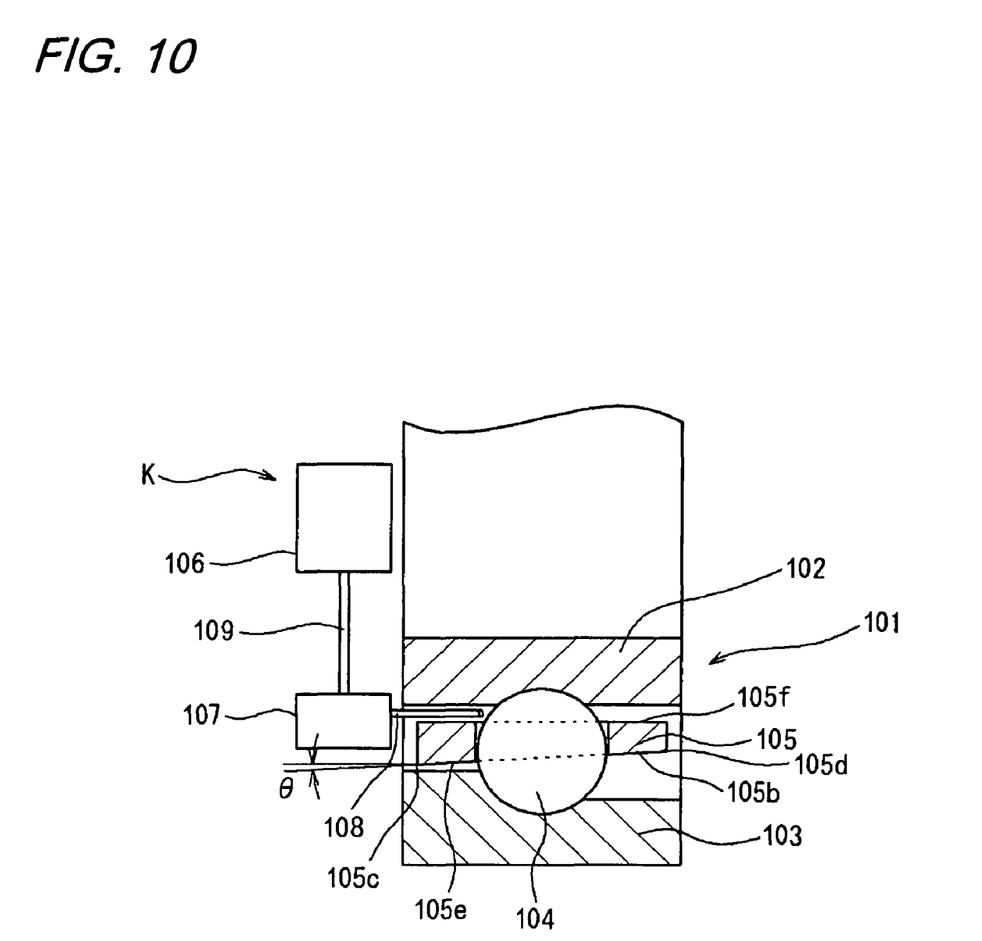
FIG. 10 is a schematic sectional view illustrating another attaching position of an oil filling unit.

In addition, in the embodiment, while the tank 106 and the pump 107 of the oil filling unit K are incorporated in the rolling bearing 101, the tank 106 and the pump 107 may be attached to a position outside the rolling bearing 101, for example, an appropriate position such as a housing to which the rolling bearing 101 is attached. In addition, as is shown in FIG. 10, all the configurations of the oil filling unit K may be provided outside the rolling bearing 101, and on the contrary, all the configurations of the oil filling unit K can be incorporated in the rolling bearing 101.

As long as the oil filling unit K can fill lubricant in the interior of the rolling bearing bit by bit, the invention is not limited to the configuration according to the embodiment described above. For example, an oil mist lubricating unit, an oil and air lubricating unit or an oil jet lubricating unit may be adopted, provided that those unit can fill a minute amount of lubricant in the rolling bearing.

In addition, the invention is not limited to the case where the rolling bearing 101 is lubricated by the oil filling unit K, and hence, the rolling bearing 101 can be lubricated by other lubricating modes including, for example, lubrication by grease.

What is claimed is:

1. A rolling bearing comprising:
an inner ring including an inner ring raceway surface on an outer circumference;
an outer ring including an outer ring raceway surface on an inner circumference and a shoulder portion formed on one axial side of the outer ring raceway surface in such a manner as to project radially inwards from the other axial side of the outer ring raceway surface;
a plurality of rolling elements which roll between the inner ring raceway surface and the outer ring raceway surface; and
a cage adapted to hold the plurality of rolling elements at predetermined intervals in a circumferential direction and whose rotation is guided through sliding contact of part of an outer circumference thereof with the shoulder portion of the outer ring,
wherein the outer circumferential surface of the cage comprises a tapered surface in which the outer circumferential surface is formed in such a manner as to decrease in diameter as extending from the one axial end portion to the other axial end portion or a curved surface in which a section including an axis thereof forms a curve which can be differentiated.

2. A rolling bearing as set forth in claim 1, wherein the rotation of the cage is guided through sliding contact of a guided surface of the cage with a guiding surface of the shoulder portion of the outer ring, and
wherein a guiding space which is a radial space between the guiding surface of the shoulder portion of the outer ring and the guided surface of the cage is made to increase as approaching the rolling elements.

3. A rolling bearing as set forth in claim 2, wherein the guiding surface of the shoulder portion of the outer ring is a tapered surface or a curved surface in which a section including axis thereof forms a curve which can be differentiated.

4. A rolling bearing assembly comprising:
a rolling bearing as set forth in claim 1, and
an oil filling unit for filling a minute amount of lubricant in the rolling bearing at predetermined intervals,
wherein the oil filling unit comprises a tank for storing a lubricant, a pump for sucking the lubricant in the tank for discharge, a lubricant discharging nozzle provided at a discharging opening of the pump for discharging the lubricant, and a driving part for driving the pump, and
wherein the lubricant discharging nozzle is disposed between an inner circumferential surface of the cage and the inner ring and is made to open in any position within a range where the cage and the inner ring confront each other.

5. A rolling bearing as set forth in claim 1, wherein the curved surface is formed in such a manner as to decrease in diameter as extending in a direction from the one axial end portion to the other axial end portion.

* * * * *